(12) United States Patent
Cheng et al.

(10) Patent No.: US 7,347,133 B2
(45) Date of Patent: *Mar. 25, 2008

(54) LASER GUIDING DEVICE FOR TILE CUTTING MACHINE

(75) Inventors: Chin Ming Cheng, Taichung Hsien (TW); Chou Jenq Lin, Taichung Hsien (TW)

(73) Assignee: Motomax Electric Co., Ltd., Taichung Hsien (TW)

( * ) Notice: Subject to any disclaimer, the term of this patent is extended or adjusted under 35 U.S.C. 154(b) by 482 days.

This patent is subject to a terminal disclaimer.

(21) Appl. No.: 10/844,510

(22) Filed: May 13, 2004

(65) Prior Publication Data

US 2005/0098012 A1 May 12, 2005

Related U.S. Application Data

(63) Continuation-in-part of application No. 10/704,799, filed on Nov. 12, 2003, now Pat. No. 6,976,764.

(51) Int. Cl.
*B26D 7/00* (2006.01)
*B27B 5/29* (2006.01)
(52) U.S. Cl. ..................... 83/520; 83/522.15
(58) Field of Classification Search .......... 83/520, 83/521, 522.15, 522.16; 362/89, 253, 259, 362/285, 287; 30/388–391
See application file for complete search history.

(56) References Cited

U.S. PATENT DOCUMENTS

| 5,285,708 | A | * | 2/1994 | Bosten et al. | 83/520 |
| 5,375,495 | A | * | 12/1994 | Bosten et al. | 83/520 |
| 5,967,645 | A | * | 10/1999 | Anderson | 362/259 |
| 6,688,203 | B2 | * | 2/2004 | Chen | 83/520 |
| 6,742,430 | B2 | * | 6/2004 | Chen | 83/520 |
| 6,976,764 | B2 | * | 12/2005 | Cheng et al. | 362/89 |
| 6,988,439 | B2 | * | 1/2006 | Liu et al. | 83/520 |
| 7,096,587 | B2 | * | 8/2006 | Onose et al. | 30/390 |
| 7,131,206 | B2 | * | 11/2006 | Wu | 30/392 |
| 2003/0233921 | A1 | * | 12/2003 | Garcia et al. | 83/520 |
| 2004/0049927 | A1 | * | 3/2004 | Wu | 30/391 |
| 2006/0101969 | A1 | * | 5/2006 | Garcia et al. | 83/477.2 |

* cited by examiner

*Primary Examiner*—Stephen Choi
(74) *Attorney, Agent, or Firm*—Bacon & Thomas, PLLC

(57) ABSTRACT

A laser guiding device is adjustably connected to a protection member on a top surface of the tile cutting machine so as to produce a laser beam on a tile to be cut. An adjusting screw threadedly and transversely extends through the laser guiding device and the protection member such that the position of the laser generating piece of the laser guiding device can be adjusted. The laser beam is visible regardless of the surface condition of the tile. A first fence is pivotably connected to an open bottom of the protection member to cover the rotating blade. A second fence is pivotally connected to the protection member and is pivoted upward by the tile so as to pivot the first fence upward.

3 Claims, 7 Drawing Sheets

LASER GUIDING DEVICE FOR TILE CUTTING MACHINE

The present invention is a Continuation-In-Part application of applicant's former application of application Ser. No. 10/704,799, filed on Nov. 12, 2003 now U.S. Pat. No. 6,976,764.

FIELD OF THE INVENTION

Background of the Invention

A conventional tile cutting machine 10 used to cut a tile 15 is shown in FIG. 1 and generally includes a base 11 having a top surface 12 on which a tile 15 to be cut is put. A rotating blade 13 is received in a slot defined through the top surface 12 and a protection member 17 is pivotably fixed to the base 11 and mounted above the blade 13 so as to protect the user from being injured by the blade 13. A gauge 14 is located on a side of the base 11 and a clamping device 16 is slidably connected to the gauge 14. A corner of a tile 15 to be cut is engaged with the recess in the clamping device 16 and moved together with the clamping device 16 toward the blade 13. A cutting line is pre-set on the surface of the tile 15 so that the user aligns the blade 13 with the cutting line and cuts the tile 15 along the cutting line. Nevertheless, the surface of the tile 15 may not be suitable to draw a line thereon and the line could be hidden by the debris during operation so that the user has to stop frequently to make sure that the cutting line is visible.

The present invention intends to provide a laser guiding device that generates a laser line on the tile to be cut and the laser guiding device is conveniently adjustable relative to the tile.

SUMMARY OF THE INVENTION

The present invention relates to a laser guiding device for a tile cutting machine and the device includes a protection member having a first end connected to a support member fixed on the top surface of the base of the tile cutting machine and the protection member has an open bottom so as to receive the rotating blade. A power supply assembly is received in a chamber in the protection member and electrically connected to a laser generating assembly connected to the protection member. A lens is connected to a second end of the body and located aligned with the laser generating assembly. The laser generating assembly comprises a tube through which a laser generating piece is received and located in alignment with the lens. A holding member is movably connected to the protection member so that the tube and the laser generating piece extend through and are positioned to the holding member.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
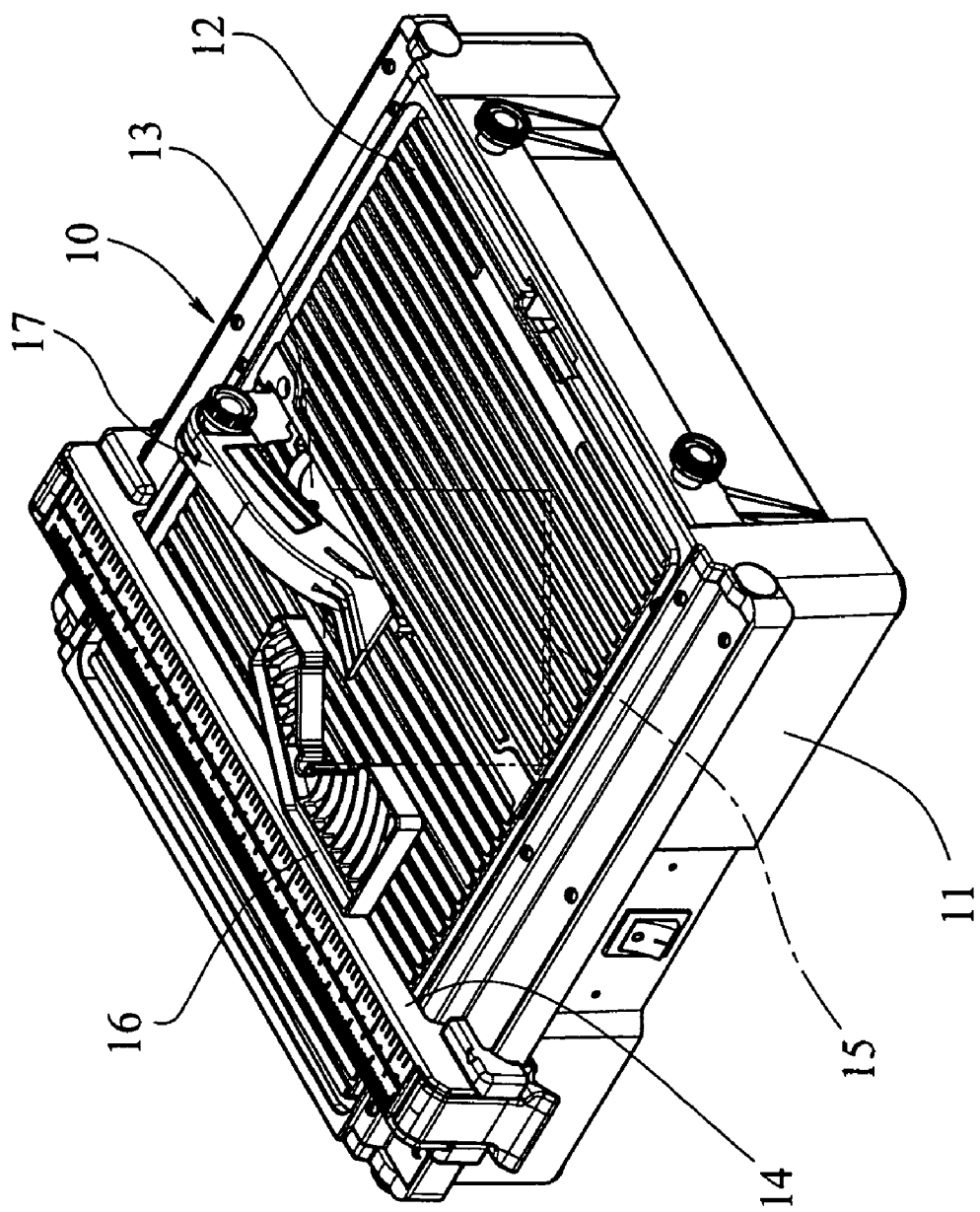
FIG. 1 is a perspective view to show the conventional tile cutting machine.
Figure 2:
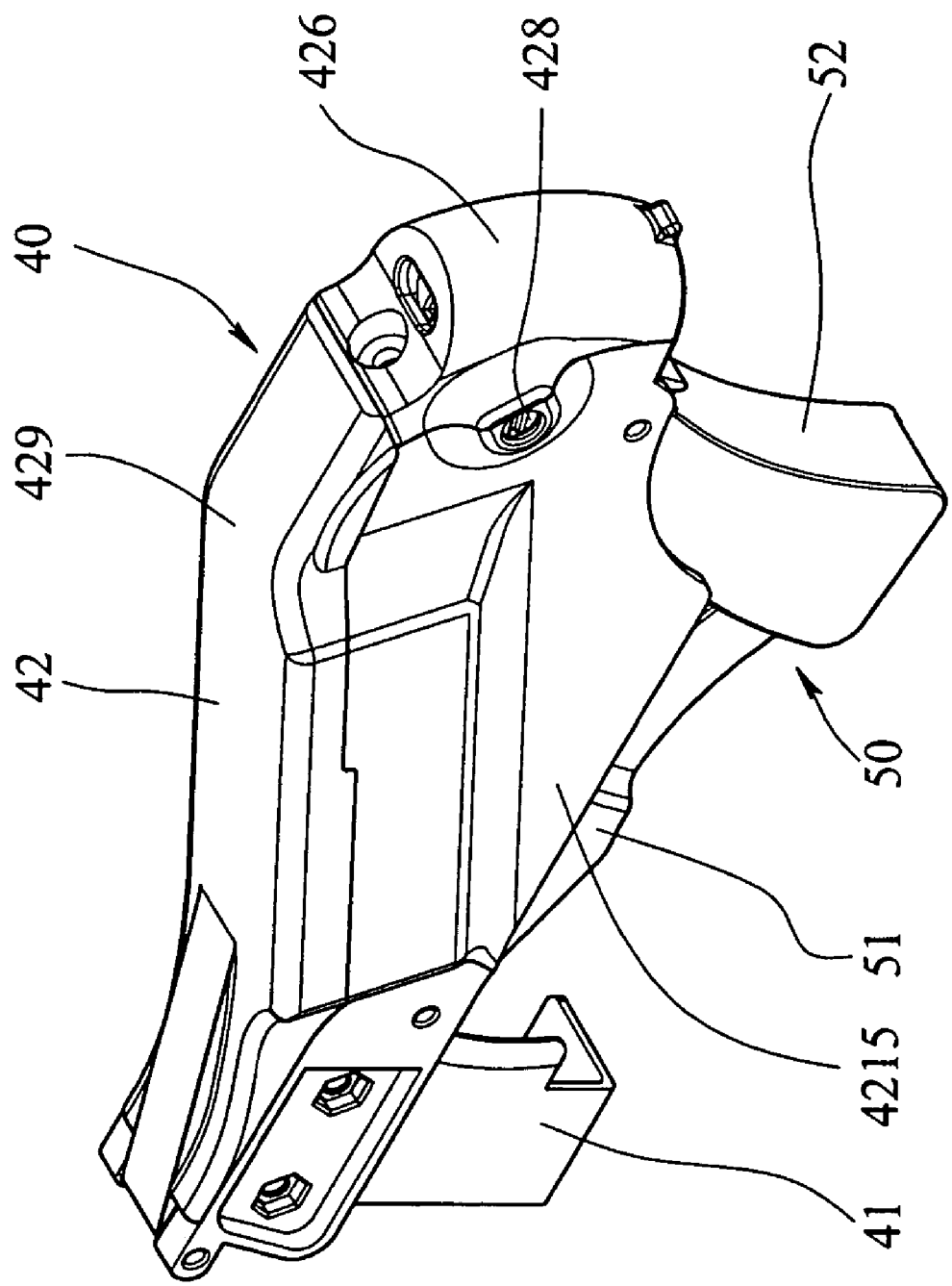
FIG. 2 is a perspective view to show the laser guiding device of the present invention.
Figure 3:
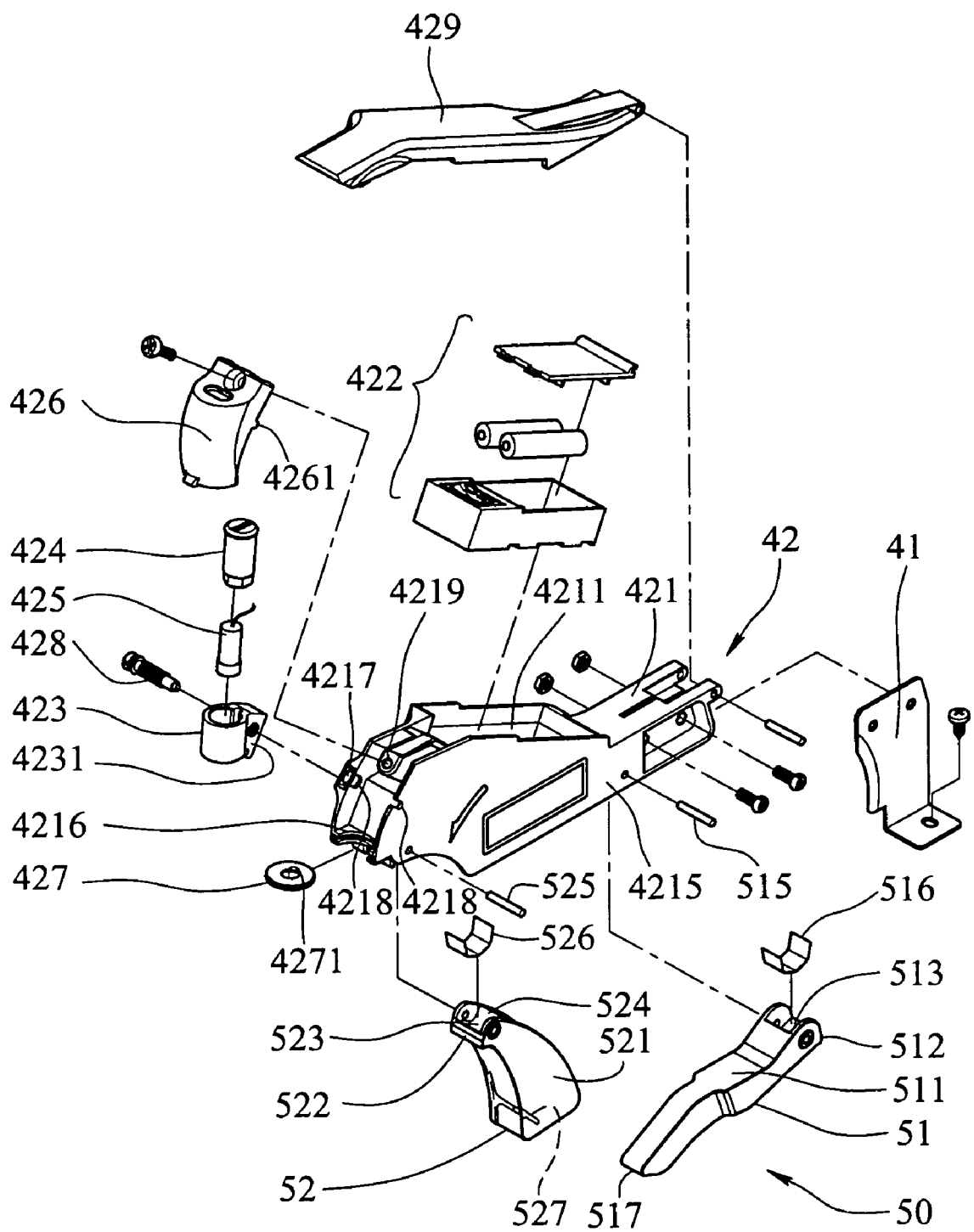
FIG. 3 is an exploded view to show the laser guiding device of the present invention.
Figure 4:
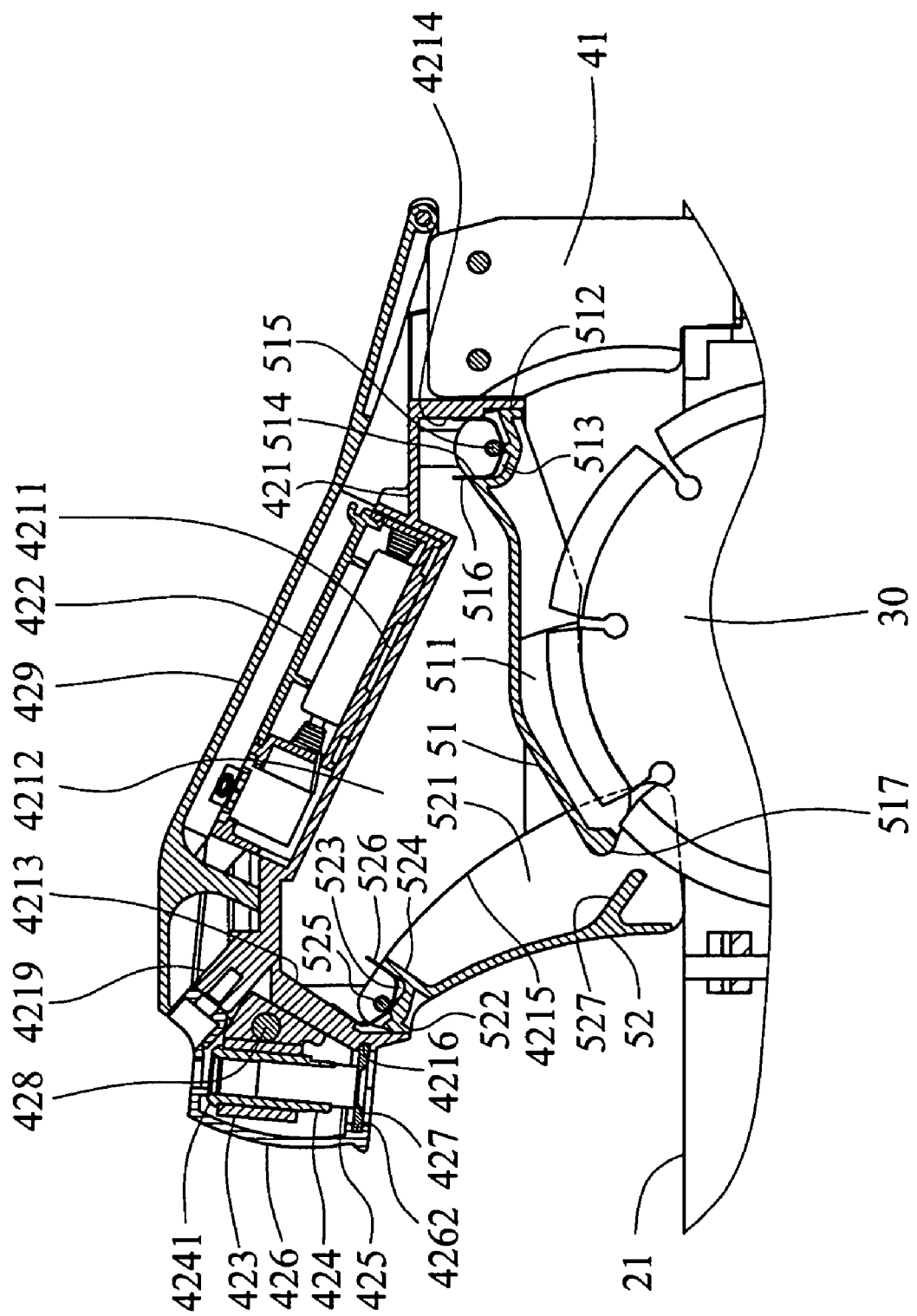
FIG. 4 shows a cross sectional view of the laser guiding device of the present invention, wherein no tile is put on the top surface of the tile cutting machine.

Referring to FIGS. 2, 3, 4 and 6, a tile cutting machine includes a base 20 with a gauge 80 on a side of the base 20 and a rotating blade 30 extends from a slot defined through a top surface 21 of the base 20. A clamping device 70 is slidably connected to the gauge 80 so as to clamp a tile 60 at a pre-set angle. The laser guiding device 40 of the present invention comprises a protection member 42 that has a first end 421 connected to an L-shaped support member 41 which projects out from the top surface 21 and is fixed to the base 20. The protection member 42 has an open bottom 4212 (FIG. 4) so as to receive the rotating blade 30 therein. A power supply assembly 422 is received in a chamber 4211 defined in a top of the protection member 42 and a cover 429 is used to close the chamber 4211. The protection member 42 includes two sidewalls 4215 which extend from a second end of the protection member 42 and a groove 4216 is defined in the second end of the protection member 42 so that a part of a lens 427 is engaged with the groove 4216. The lens 427 includes a central hole 4271 through which a laser beam goes through.

A laser generating assembly is connected to the second end of the protection member 42 and comprises a tube 424 through which a laser generating piece 425 is received and located in alignment with the lens 427. A holding member 423 is movably connected to the protection member 42 and the tube 424 and the laser generating piece 425 both extend through and positioned to the holding member 423. The tube 424 includes a flange at an end thereof so as to rest on a top end of the holding member 423. The laser generating piece 425 is electrically connected to the power supply assembly 422.

Figure 7:
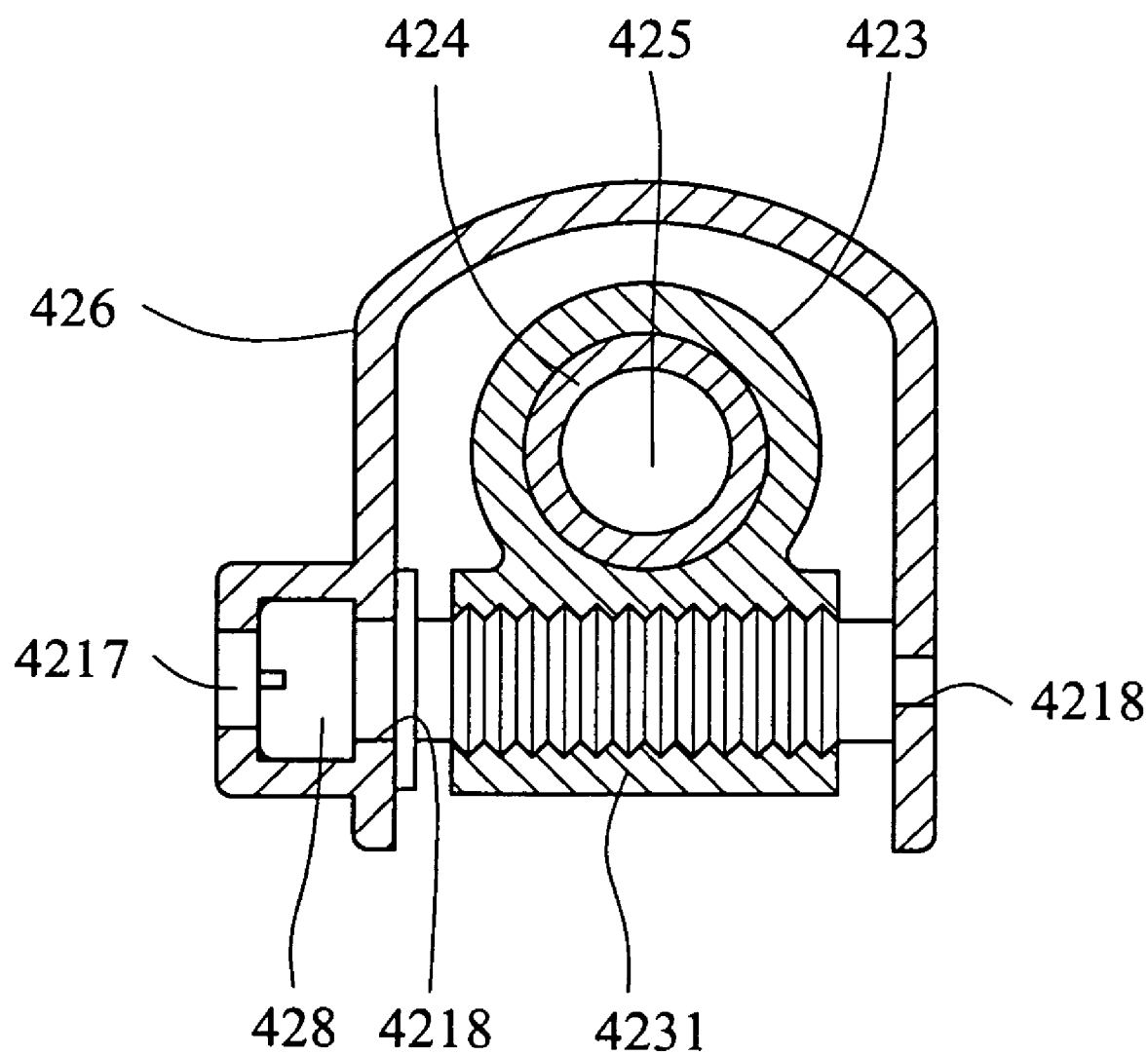
FIG. 7 is a cross sectional view to show the tube and laser generating piece are movable along the adjusting screw.

Two notches 4218 are respectively defined in the two sidewalls 4215 of the second end of the protection member 42 and an adjusting screw 428 is rotatably engaged with the two notches 4218 and threadedly extends through a threaded hole in a lug 4231 on the holding member 423. An outer wall portion is connected to one of the two sidewalls 4215 of the protection member 42 and includes an adjusting hole 4217 via which a head of the adjusting screw 428 is accessible. Therefore, as shown in FIG. 7, the holding member 423 can be adjustably moved along the adjusting screw 428 when rotating the adjusting screw 428. By the adjustment of the holding member 423, the laser beam can be precisely set relative to the rotating blade 30. A hood 426 has a first end fixed to the second end of the protection member 42 by a screw extending through a hole in the hood 426 and connected to a threaded hole 4219 in the second end of the protection member 42. A second end of the hood 426 includes a slot 4262 (FIG. 4) defined in an inside thereof so as to receive another part of the lens 427 which is then well positioned. A protrusion 4261 extends from one of two sides of the hood 426 and positions a plain section of the distal end of the adjusting screw 428 in the notches 4218. The tube 424 and the laser generating piece 425 are covered by the hood 426.

A fence assembly 50 is composed of a first fence 51 and a second fence 52. The first fence 51 is a U-shaped member 511 and has a first end thereof pivotably connected between the two sidewalls 4215 of the protection member 42. The first fence 51 is located above the rotating blade 30. A first recess 513 is defined in the first end of the first fence 51 and a first pin 515 extends through two sides of the first recess 513 and the two sidewalls 4215 of the protection member 42. A first U-shaped flexible plate 516 is rested in the first recess 513 and positioned by the first pin 515. One of two sides of the first U-shaped flexible plate 516 contacts against an upright wall 4214 in the first end 421 of the protection member 42 and the other one of the two sides of the first U-shaped flexible plate 516 contacts against an upright inside 514 of the first recess 513. The first end of the first fence 51 has a first stop surface 512 which contacts against the upright wall 4214 in the first end 421 of the protection member 42 so as to prevent the first fence 51 from being pivoted downward.

Figure 5:
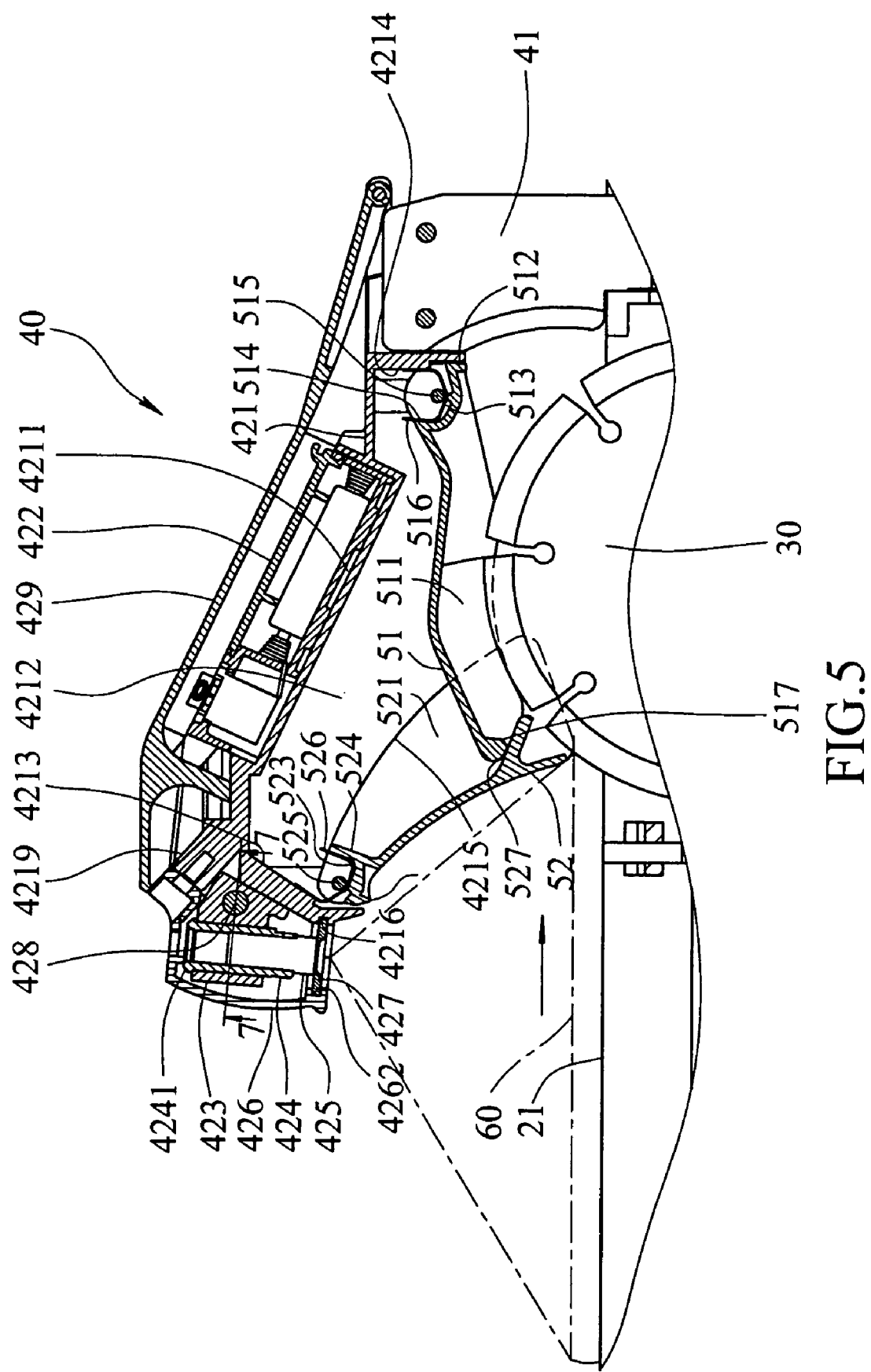
FIG. 5 shows that the second fence is pivoted upward by a tile on the top surface of the cutting machine and the first fence is pivoted upward by the second fence.
Figure 6:
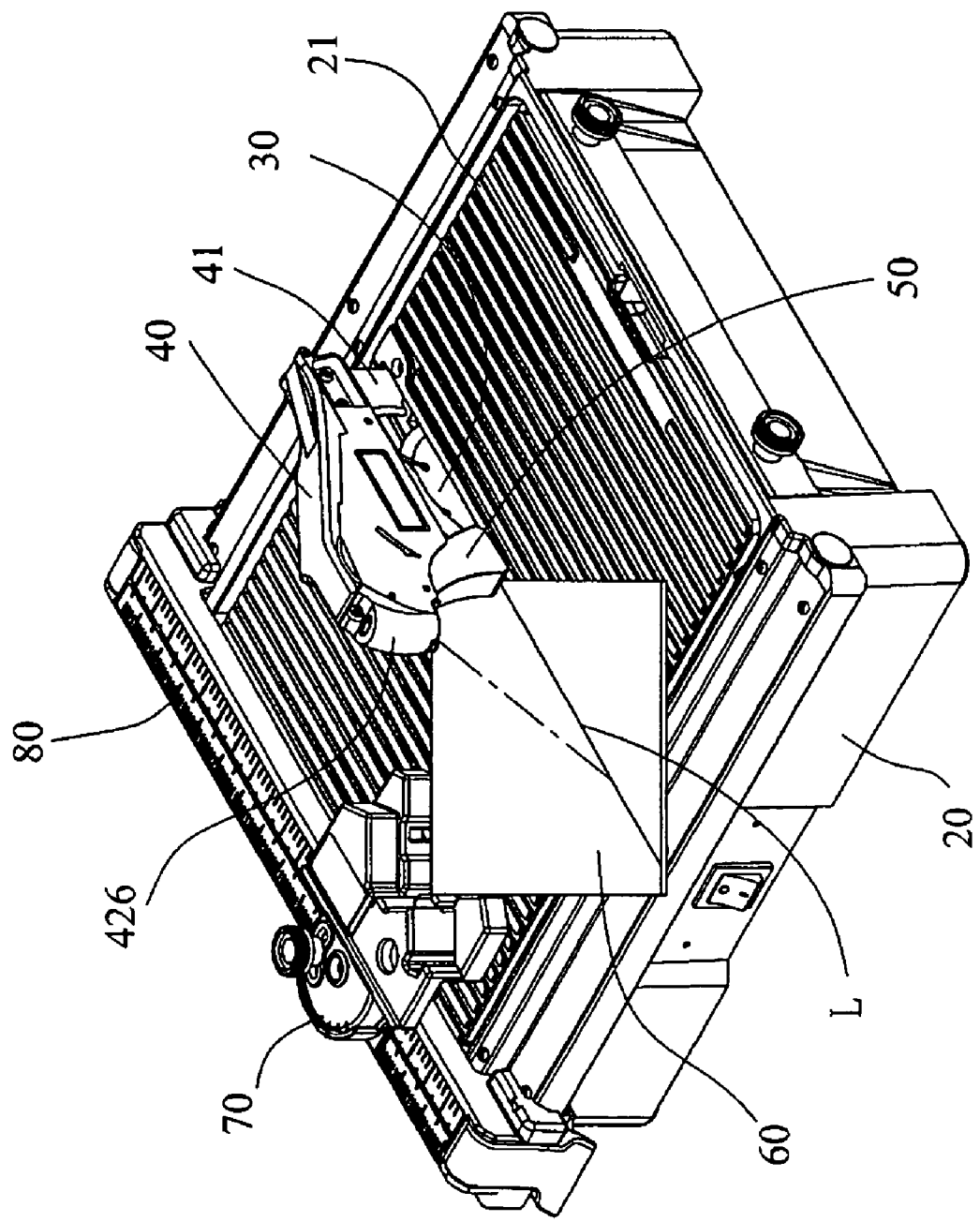
FIG. 6 is a perspective view to show the laser guiding device of the present invention generates a laser beam on the tile to be cut.

The second fence 52 is a U-shaped member 521 and has a first end thereof pivotably connected between the two sidewalls 4215 of the second end of the protection member 42. A protrusion 527 extends from an inside of a second end of the second fence 52 and a second end 517 of the first fence 51 is rested on the protrusion 527 of the second fence 52 when the second fence 52 is pushed upward by a tile 60 as shown in FIG. 5. A second recess 523 is defined in the first end of the second fence 52 and a second pin 525 extends through two sides of the second recess 523 and the two sidewalls of the protection member 42. A second U-shaped flexible plate 526 is rested in the second recess 523 and positioned by the second pin 525. One of two sides of the second U-shaped flexible plate 526 contacts against an upright wall 4213 in second end of the protection member 42 and the other one of the two sides of the second U-shaped flexible plate 526 contacts against an upright inside 524 of the second recess 523. The first end of the second fence 52 has a second stop surface 522 which contacts against the upright wall 4213 in the first end 421 of the protection member 42 so as to prevent the second fence 52 from being pivoted downward. Therefore, when a tile 60 is put on the top surface 21 of the tile cutting machine, a laser beam "L" as shown in FIG. 6 is marked on the tile 60 and the blade 30 cuts the tile 60 along the laser beam "L". The second end of the second fence 52 is raised upward by the thickness of the tile 60 so that the second end 517 of the first fence 51 is pivoted upward by the upward pivotal movement of the protrusion 527 of the second fence 52. After the tile 60 is removed, the first and second fences 51 and 52 are pivoted downward by the first and second U-shaped flexible plates 516, 526 till the first and second stop surfaces 512 and 522 respectively contact the upright walls 4214 and 4213 respectively.

While we have shown and described the embodiment in accordance with the present invention, it should be clear to those skilled in the art that further embodiments may be made without departing from the scope of the present invention.

What is claimed is:

1. A laser guiding device for a tile cutting machine which includes a base, a rotating blade extending from a top surface of the base for cutting a tile put on the top surface of the base and a support member fixed to the base, the laser guiding device comprising:

a protection member having a first end connected to the support member of the tile cutting machine, a chamber and an open bottom adapted to receive the rotating blade of the tile cutting machine therein;

a power supply assembly received in the chamber;

a holding member movably connected to a second end of the protection member; and a laser generating assembly extending through and positioned to the holding member;

wherein a lens is connected to the second end of the protection member, a hood has a first end fixed to the second end of the protection member and a second end including a slot defined in an inside thereof so as to receive a part of the lens, and the laser generating assembly is covered by the hood and located in alignment with the lens.

2. The device as claimed in claim 1, wherein an adjusting screw extends through two sidewalls of the second end of the protection member and a threaded hole in a lug on the holding member, the holding member being adjustably moved along the adjusting screw when rotating the adjusting screw.

3. The device as claimed in claim 1, wherein the laser generating assembly has a tube extending through and positioned to the holding member and through which a laser generating piece is received.

* * * * *